United States Patent
Fazekas et al.

(10) Patent No.: US 11,433,942 B2
(45) Date of Patent: Sep. 6, 2022

(54) ELECTROMECHANICAL MOTOR VEHICLE POWER STEERING MECHANISM FOR ASSISTING STEERING OF A MOTOR VEHICLE WITH POSITION CONTROL AND COLUMN TORQUE CONTROL MODE

(71) Applicants: THYSSENKRUPP PRESTA AG, Eschen (LI); thyssenkrupp AG, Essen (DE)

(72) Inventors: Csaba Fazekas, Budakeszi (HU); Ádám Varga, Budapest (HU); Imre Benyó, Budapest (HU)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 484 days.

(21) Appl. No.: 16/487,187

(22) PCT Filed: Feb. 22, 2017

(86) PCT No.: PCT/EP2017/054049
§ 371 (c)(1),
(2) Date: Aug. 20, 2019

(87) PCT Pub. No.: WO2018/153443
PCT Pub. Date: Aug. 30, 2018

(65) Prior Publication Data
US 2020/0039583 A1    Feb. 6, 2020

(51) Int. Cl.
*B62D 15/02*    (2006.01)
*B62D 1/181*    (2006.01)
(Continued)

(52) U.S. Cl.
CPC ......... *B62D 15/0215* (2013.01); *B62D 1/181* (2013.01); *B62D 5/0463* (2013.01); *B62D 15/025* (2013.01); *G05D 1/021* (2013.01)

(58) Field of Classification Search
CPC .. B62D 15/0215; B62D 1/181; B62D 5/0463; B62D 15/025; B62D 1/286; G05D 1/021
See application file for complete search history.

(56) References Cited

U.S. PATENT DOCUMENTS

| | | | |
|---|---|---|---|
| 6,212,453 B1* | 4/2001 | Kawagoe | B62D 5/0463 701/28 |
| 2010/0152952 A1* | 6/2010 | Lee | B62D 15/025 701/41 |

(Continued)

FOREIGN PATENT DOCUMENTS

| | | |
|---|---|---|
| CN | 101746412 A | 6/2010 |
| CN | 105416277 A | 3/2016 |

(Continued)

OTHER PUBLICATIONS

English Translation of International Search Report issued in PCT/EP2017/054049, dated Nov. 6, 2017.

*Primary Examiner* — Thomas Ingram
(74) *Attorney, Agent, or Firm* — thyssenkrupp North America, LLC

(57) ABSTRACT

A motor vehicle power steering mechanism with an electric motor for steering assist and/or steering, and a steering controller, which controls the electric motor with a position control mode for autonomous driving and/or automatic steering and a torque control mode for manual steering by a driver. The steering controller includes a steering column reference controller, an arbitration unit, a column torque controller, a steering algorithm, and the steering system. The steering column reference controller calculates for position control based on a reference position and a measured position, and a first reference steering column torque. A steering algorithm calculates for torque control based on a measured column torque and a second reference steering column torque. The arbitration unit weights and adds the (Continued)

first and second reference steering column torques, and the output of the arbitration unit is input to the column torque controller.

20 Claims, 3 Drawing Sheets

(51) Int. Cl.
*B62D 5/04* (2006.01)
*G05D 1/02* (2020.01)

(56) References Cited

U.S. PATENT DOCUMENTS

| | | | |
|---|---|---|---|
| 2015/0057889 A1* | 2/2015 | Tamaizumi | B62D 5/0463 |
| | | | 701/41 |
| 2016/0075327 A1* | 3/2016 | Kiyokawa | B62D 15/0285 |
| | | | 701/301 |
| 2016/0185387 A1* | 6/2016 | Kuoch | B60K 35/00 |
| | | | 701/41 |
| 2018/0154924 A1* | 6/2018 | Albrecht | B62D 15/025 |

FOREIGN PATENT DOCUMENTS

| | | |
|---|---|---|
| CN | 105517873 A | 4/2016 |
| DE | 19943410 A | 5/2000 |
| EP | 2842833 A | 3/2015 |
| WO | 2007021192 A | 2/2007 |

* cited by examiner

ELECTROMECHANICAL MOTOR VEHICLE POWER STEERING MECHANISM FOR ASSISTING STEERING OF A MOTOR VEHICLE WITH POSITION CONTROL AND COLUMN TORQUE CONTROL MODE

CROSS REFERENCE TO RELATED APPLICATIONS

This application is a U.S. National Stage Entry of International Patent Application Serial Number PCT/EP2017/054049, filed Feb. 22, 2017, the entire contents of which are incorporated herein by reference.

FIELD

The present disclosure generally relates to an electromechanical motor vehicle power steering mechanism for assisting steering of a motor vehicle.

BACKGROUND

In an electromechanical power steering mechanism a steering shaft is connected to a steering wheel for operation by the driver. The steering shaft is coupled to a steering rack via a gear pinion. Steering rack rods are connected to the steering rack and to steered wheels of the motor vehicle. A rotation of the steering shaft causes an axial displacement of the steering rack by means of the gear pinion which is connected to the steering shaft in a torque-proof manner. Assist force is applied to a steering mechanism by driving an electric motor. The electromechanical power steering mechanism can be of a column assist or rack assist type. Column assist EPAS systems have an electric motor connected to the steering column. Rack assist EPAS systems have an electric motor that is connected to the steering rack. The electromechanical power steering mechanism can also be a steer-by-wire system.

A steering controller controls the assist of the electric motor. The steering controller can include a torque controller. Steering algorithms create an input to the torque controller. These steering algorithms influence for example the steering feel of the driver. They can include for example, damping, active return, pull drift and likewise functions. The torque controller receives signals representative of the vehicle velocity and the torque applied to the steering wheel by the vehicle operator. In response to the vehicle velocity, the operator torque and the rotor position signal detected by a rotor position sensor, the controller determines the target motor torque and provides the signal through to the motor controller, where the motor currents are calculated via PWM (pulse-width modulation).

It is further known to have a separate position controller for automatic and/or autonomous driving, which receives signals representative of the measured and reference (target) position of the steered wheels, measured and reference rack position, measured and reference electric motor angle or measured and reference pinion angle respectively, to calculate a target motor torque.

The torque controller and the position controller are known to be connected in parallel to realize position and torque control at the same time. The outputs of the two controllers are added to get the target motor torque. To make sure that the column torque controller is stronger in hands-on situation (manual mode), the position controller is limited, and to make sure that position controller is stronger in hands-off situation (automatic or autonomous mode), the output of the column torque controller is reduced. The parallel-operated controllers mutually interact with each other, which can cause oscillation in the closed feedback loop. To avoid oscillation, both controllers have to be tuned weak. Therefore, the performance of the controllers and the steering feel are reduced.

Thus a need exists for an electromechanical motor vehicle power steering mechanism for automatic and/or autonomous driving that can calculate a target motor torque based on position and column torque control with a good steering feel.

DETAILED DESCRIPTION

Figure 1:
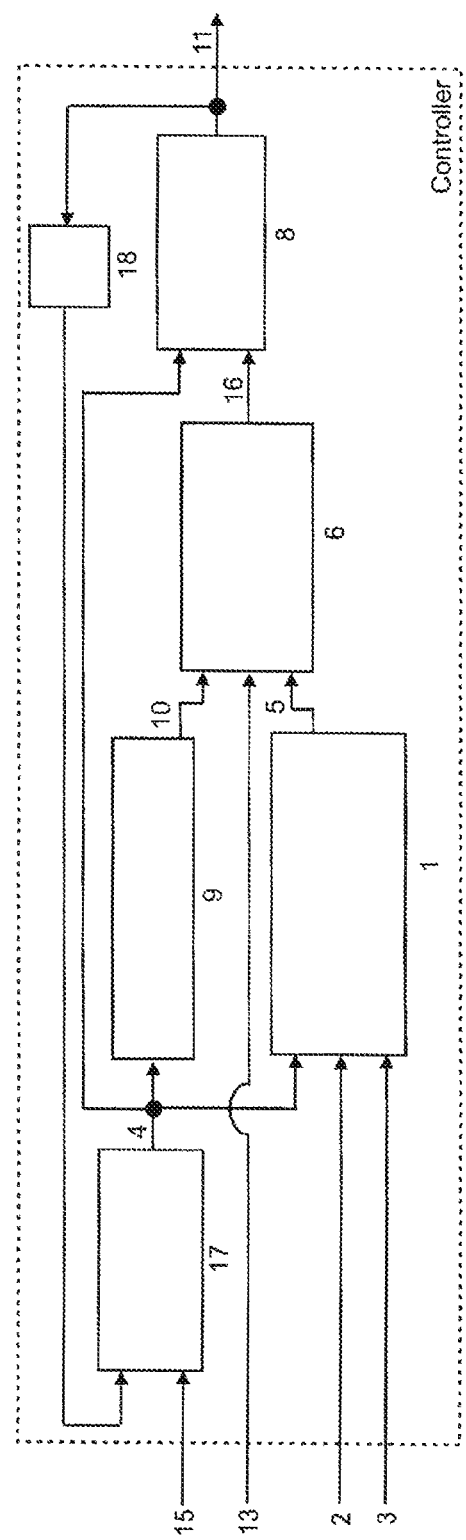
FIG. 1 is a schematic view of a part of a steering controller.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to an electromechanical motor vehicle power steering mechanism for assisting steering of a motor vehicle and a method to determine a target motor torque.

Accordingly, a motor vehicle power steering mechanism for assisting steering of a motor vehicle comprising a rack and pinion steering gear or only a rack (in case of steer-by-wire), an electric motor for steering assist, and a steering controller, which controls the assist of the electric motor with a position control mode for autonomous driving and/or automatic steering and a torque control mode for manual steering by a driver, is provided, wherein the steering controller comprises a steering column reference controller, an arbitration unit, a column torque controller and steering algorithm, wherein the steering column reference controller calculates for position control based on a reference position and a measured position a first reference steering column torque and a steering algorithm calculates for torque control based on a measured column torque a second reference steering column torque, wherein the arbitration unit weights and adds the first and second reference steering column torques, and wherein the output of the arbitration unit is input to column torque controller. This way position control is realized with the column torque controller. A parallel connection of the position and column torque control can be dispensed which leads to a much better overall steering feel.

Preferably, the steering column reference controller is a state feedback controller.

It is preferred, that the reference position and the measured position are representing the reference and measured position of the steering gear, respectively.

Preferably, the position is given by the rack position, the position of the electric motor or the pinion angle. The position of the electric motor can be used.

Further a method to determine a target motor torque for a motor vehicle power steering mechanism for assisting steering of a motor vehicle comprising a steering gear, wherein the motor vehicle power steering mechanism has an electric motor for steering assist, and a steering controller, which controls the assist of the electric motor with a position control mode for autonomous driving and/or automatic steering and a torque control mode for manual steering by a driver, is provided, wherein the steering controller comprises a steering column reference controller, an arbitration unit, a column torque controller and a steering algorithm, wherein the method comprises the following steps:

Calculation of a first reference steering column torque for position control based on a reference position, a measured position and the states determined by the steering column reference controller;

Calculation of a second reference steering column torque for torque control based on states determined by a steering algorithm;

Weighting and adding of the first and second reference steering column torques by the arbitration unit;

Sending the output of the arbitration unit to column torque controller as input; and Calculation of the target motor torque by the column torque controller;

This method is advantageous, because the position control is carried out with the column torque controller. Further, the steering column reference controller and the column torque controller are connected in series which leads to an improved steering feel, because the disadvantage of parallel connection does not exist.

Advantageously, the weighting is based on one or more of the following parameters: measured torque sensor unit (TSU) torque, vehicle speed, measured position and speed of the steering gear. Those signals can determine the control mode; position or column torque mode.

In a preferred embodiment, the weighting is linear and based on the measured TSU torque. In this context, it can be provided, that the weighting includes the following steps: if the measured TSU torque is below a predefined minimum value, the weight of the first reference steering column torque is set to a high value; If the measured TSU torque is higher than a predefined maximum value, the weight of the second reference steering column torque is set to a high value. If the measured TSU torque is between the predefined minimum value and the predefined maximum value then the two weights are linearly ramped accordingly.

In order to decrease undesired oscillation of the output of the arbitration unit, the weights of the first and second reference steering column torques can be computed by the addition of the linear arbitration weights and their derivative multiplied by tunable gains.

It is also possible in one embodiment, that the arbitration unit compares the measured TSU torque to the first and the second reference steering column torques; If the measured TSU torque is much closer to the second reference steering column torque then the weight of the second reference steering column torque is increased; If the measured TSU torque is much closer to the first reference steering column torque, then the weight of the first reference steering column torque is increased.

It is also possible to modify the distance between the reference position of the gear and the measured position of the gear by the weighting of the arbitration unit, wherein when the weight of the first reference steering column torque is a lower value then the reference position of the gear is moved artificially closer to the measured position of the gear.

Preferably, the steering column reference controller is a state feedback controller and that the states can be estimated or measured.

It is favorable for all embodiments, to apply safety functions of the column torque controller to the reference steering column torque calculated by the arbitration unit. This way safety functions are implemented on the reference steering column torque signal side and limitations on the target motor torque can be avoided.

FIG. 1 shows a schematic illustration of a steering controller. Input to the steering column reference controller, referred to as StcReqTrq controller 1 is the reference (target) position 2, the measured position 3 and measured or estimated states 4 of the steering system. States means a set of signals which describe the system behaviour completely and uniquely. States can be measured or estimated. If it is estimated than state estimator is required. In EPAS system a possible set of the states are the following: position of the EPAS system (either motor angle or pinion angle or rack position), speed of the EPAS system (either motor angle speed or pinion angle speed or rack speed), either TSU torque or angel difference between the pinion and the steering wheel, derivative of the TSU torque (or derivative of the angle difference), motor torque, load torque and driver torque (i.e. the states are the position and speed of the system, and the torques which effect to it). The StcReqTrq controller 1 computes a first reference steering column torque 5 based on the input for position control. The state of the art of the column torque control concepts comprises a steering algorithm 9 to calculate a second reference steering column torque 10, the column torque controller 8 to calculate the target motor torque 11 from the second reference steering column torque 10 and the states 4, and an estimator 17 to calculate the states 4 of the system. The first and second reference steering column torques 5, 10 are weighted and added by the arbitration 6 to realize position and column torque control at the same time. The weighted sum is the reference steering column torque 16 and input of the column torque controller 8 in column torque frame. Thus, the steering algorithm 9 and the StcReqTrq controller 1 are connected in parallel but they are connected to the column torque controller 8 in series. The operation of weighting and adding is called arbitration.

The column torque controller 8 calculates the target motor torque 11, which is input to the steering gear. The steering gear generates outputs 15: a motor angle speed, a motor torque, a TSU torque 13 and a position 3. The measured outputs 15 of the steering system and the position 3 are fed back in two feedback loops. A first feedback loop (containing the measurements 15) with a delayed feedback 18 of the target motor torque 11 goes to the estimator 17 to calculate the estimated states 4 of the gear system. The second feedback loop (containing the measurement 3) goes to the StcReqTrq controller 1. The estimated states 4 of the steering gear are, as described above, input to the column torque controller 8 to the StcReqTrq controller 1 and to the steering algorithm 9.

The weighted sum of the first and second reference steering column torques 5, 10 can be computed in several ways, e.g. based on TSU torque, vehicle speed, measured position and speed of the steering gear etc., comparing the required steering column torques to the measured TSU torque.

The weights determine the importance of the different controls: if the weight of the required steering column torque of the steering algorithm is much higher than the weight of the required steering column torque of the StcReqTrq controller, then the closed loop operates as a column torque controller. If the weight of the required steering column torque of the steering algorithm is much lower than the weight of the required steering column torque of the StcReqTrq controller, then the closed loop operates as a position controller.

In one embodiment linear arbitration based on the measured TSU torque is used; If the TSU torque is below a predefined minimum value, the weight of the output of the StcReqTrq controller is high. If the TSU torque is higher than a predefined maximum value, the weight of the output of the steering algorithm is high. If the TSU torque is between the predefined minimum and maximum value then the two weights are linearly ramped accordingly.

Linear arbitration can show oscillation if the TSU torque rapidly changes. This oscillation can be decreased by application of a so-called D controller in the arbitration: the weights of the two signals are computed by the addition of the linear arbitration weights and their derivative multiplied by tunable gains.

Arbitration can also be improved by comparing the measured TSU torque to the first and the second reference steering column torques. If the TSU torque (output of the steering gear) is much closer to the output of the steering algorithm then the weight of the output of the steering algorithm is increased. If the TSU torque is much closer to the output of the StcReqTrq controller, then the weight of the output of the StcReqTrq controller is increased.

Preferably, the weight of the second reference steering column torque is computed by linear arbitration and by comparing the measured TSU torque to the first and the second reference steering column torques, as described above. The higher weight is then used as the final weight for the output of the steering torque algorithm.

It is further possible to modify the distance between the reference (target) position and the measured position as a function of the weight of the output of the StcReqTrq controller. If the distance is high, the StcReqTrq controller has a high output because the output is proportional to the distance. Therefore, if the weight of the output of the StcReqTrq controller is set to a lower value, the reference position can be artificially moved closer to the measured position, resulting in an improved steering feel.

Since the plant model of the StcReqTrq controller is linear, any limitation on the target motor torque (the output of the column torque controller) has to be avoided. Safety functions are therefore implemented at the reference steering column torque side. Safety functions can for example include a limitation of the target motor torque. In this case, the known restrictions can be transformed into limits of the reference steering column torque to be applicable at the reference steering column torque side, which is in the feedback loop right after the StcReqTrq controller and before the plant model of the StcReqTrq controller.

The StcReqTrq controller uses measured or estimated states like the column torque controller. In FIG. 1 the feedback loop is based on estimated states 4. Inputs to a state estimator 17 are the reference motor torque 11, which is delayed in a delay unit 18 and the measured values 15 from which the state estimator 17 calculates the estimated states 4. The estimated states 4 are used for the StcReqTrq controller 1 as input.

StcReqTrq controller can be designed with either rack position and reference rack position, or motor angle and reference motor angle, or pinion angle and reference pinion angle. These signals are equivalent position signals.

Figure 2:
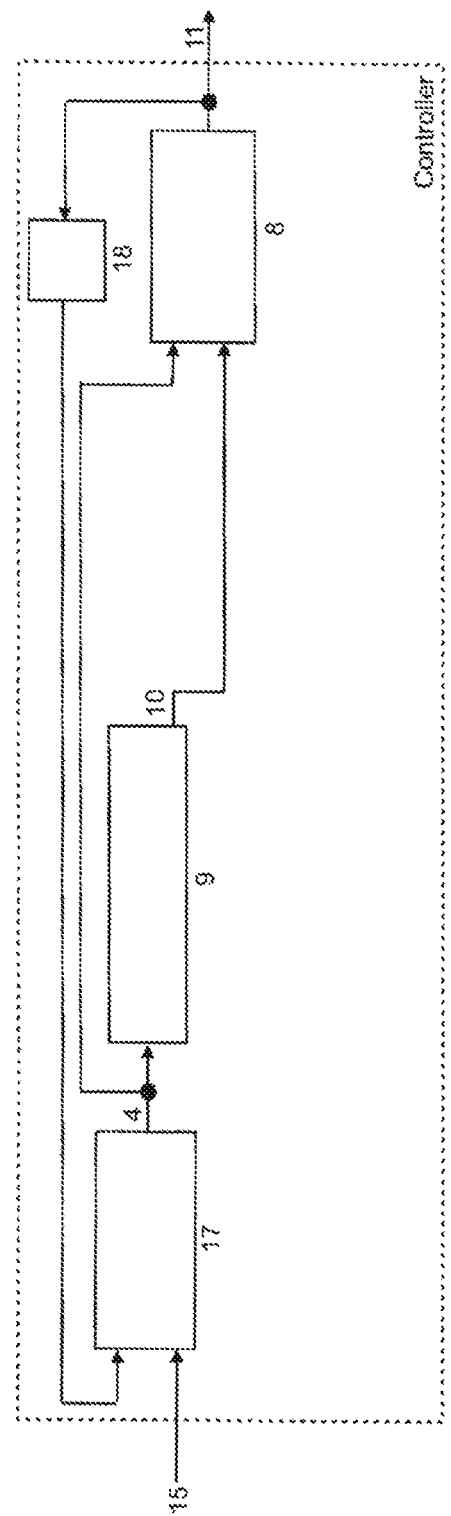
FIG. 2 is a schematic view of a prior art torque controller.
Figure 3:
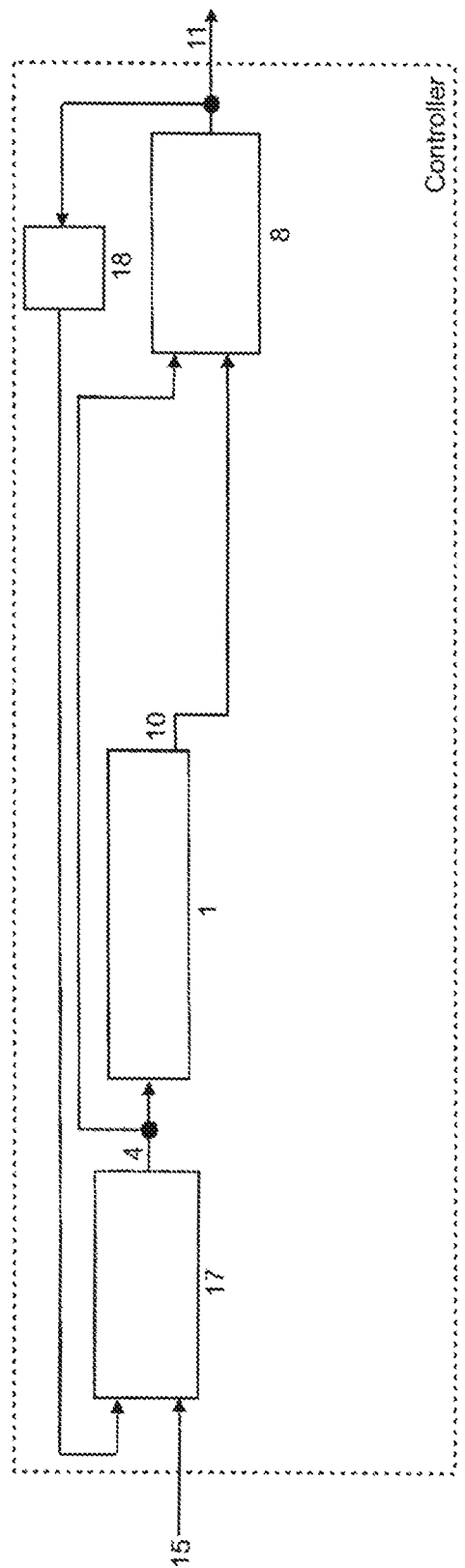
FIG. 3 is a schematic view of a prior art position controller using a torque controller.

FIG. 2 refers to a known torque controller, while in FIG. 3 a known position controller is shown. Within both controllers the steering gear outputs 15 are inputs to an estimator 17 to calculate the states 4 of the gear system. Within the torque controller the steering algorithm 9 calculates a reference steering column torque 10. Within the position controller the steering column reference controller 1 calculates a reference steering column torque 10. Both controllers feed the reference steering column torque 10 and the states 4 of the system to the column torque controller 8 to calculate the respective target motor torque 11. A first feedback loop with a delayed feedback 18 of the target motor torque 11 goes to the estimator 17 to calculate the estimated states 4 of the gear system. The torque controller and the position controller are known to be connected in parallel to realize position and torque control at the same time. The outputs of the two controllers 11 are added and weighted to get the final target motor torque.

What is claimed is:

1. A method to determine a target motor torque for a motor vehicle power steering mechanism, wherein the motor vehicle power steering mechanism has an electric motor for steering assist and/or steering, a steering controller configured to control the electric motor with a position control mode for autonomous driving and/or automatic steering and a torque control mode for manual steering, wherein the steering controller comprises a steering column reference controller, an arbitration unit, a column torque controller, and a steering algorithm, the method comprising:
    calculating a first reference steering column torque for position control based on a reference position, a measured position, and states determined by the steering column reference controller;
    calculating a second reference steering column torque for torque control based on the states determined by the steering algorithm;
    weighting and adding of the first and second reference steering column torques by the arbitration unit;
    sending the output of the arbitration unit to the column torque controller;
    calculating, via the column torque controller, the target motor torque; and
    modifying the distance between the reference position and the measured position by said weighting of the arbitration unit and moving the reference position artificially closer to the measured position when said weighting of the first reference steering column torque is a lower value.

2. The method of claim 1, wherein the reference position and the measured position correspond to the reference and measured position of a rack and pinion steering gear, respectively.

3. The method of claim 2, wherein a position is given by a rack position, a position of the electric motor or an angle of a pinion of the rack and pinion steering gear.

4. The method of claim 2, wherein said weighting is based on one or more of the following parameters: a measured TSU torque, a vehicle speed, a measured position, and a speed of the rack and pinion steering gear.

5. The method of claim 4, wherein said weighting is linear and based on the measured TSU torque.

6. The method of claim 5, comprising computing said weighting of the first and second reference steering column torques by the addition of linear arbitration weights and their derivative multiplied by tunable gains.

7. The method of claim 4, wherein said weighting includes the following steps:
when the measured TSU torque is below a predefined minimum value, said weighting of the output of the steering column reference controller is set to a high value; and
when the measured TSU torque is higher than a predefined maximum value, said weighting of the output of the steering torque algorithm is set to a high value.

8. The method of claim 4, comprising:
comparing via the arbitration unit, the measured TSU torque to the first and the second reference steering column torques;
increasing said weighting of the second reference steering column torque when the measured TSU torque is closer to the second reference steering column torque; and
increasing said weighting of the first reference steering column torque when the measured TSU torque is closer to the first reference steering column torque.

9. The method of claim 1, wherein the steering column reference controller is a state feedback controller and configured to estimate or measure the states.

10. The method of claim 1, wherein safety functions of the column torque controller are applied to the reference steering column torque calculated by the arbitration unit.

11. The method of claim 1, wherein the motor vehicle power steering mechanism is a steer-by-wire-system.

12. A method to determine a target motor torque for a motor vehicle power steering mechanism, wherein the motor vehicle power steering mechanism has an electric motor for steering assist and/or steering, a steering controller configured to control the electric motor with a position control mode for autonomous driving and/or automatic steering and a torque control mode for manual steering, wherein the steering controller comprises a steering column reference controller, an arbitration unit, a column torque controller, and a steering algorithm, the method comprising:
calculating a first reference steering column torque for position control based on a reference position, a measured position, and states determined by the steering column reference controller;
calculating a second reference steering column torque for torque control based on the states determined by the steering algorithm;
weighting and adding of the first and second reference steering column torques by the arbitration unit;
sending the output of the arbitration unit to the column torque controller;
calculating, via the column torque controller, the target motor torque,
wherein the reference position and the measured position correspond to the reference and measured position of a rack and pinion steering gear, respectively,
wherein said weighting is linear and based on a measured TSU torque.

13. The method of claim 12 wherein the reference position and the measured position correspond to the reference and measured position of a rack and pinion steering gear, respectively.

14. The method of claim 12 wherein a position is given by a rack position, a position of the electric motor, or an angle of a pinion of the rack and pinion steering gear.

15. The method of claim 12 wherein said weighting is further based on one or more of the following parameters: a vehicle speed, a measured position, or a speed of the rack and pinion steering gear.

16. The method of claim 12 comprising computing said weighting of the first and second reference steering column torques by the addition of linear arbitration weights and their derivative multiplied by tunable gains.

17. The method of claim 12 comprising:
comparing via the arbitration unit, the measured TSU torque to the first and the second reference steering column torques;
increasing said weighting of the second reference steering column torque when the measured TSU torque is closer to the second reference steering column torque; and
increasing said weighting of the first reference steering column torque when the measured TSU torque is closer to the first reference steering column torque.

18. The method of claim 12 wherein the steering column reference controller is a state feedback controller and configured to estimate or measure the states.

19. The method of claim 12 wherein safety functions of the column torque controller are applied to the reference steering column torque calculated by the arbitration unit.

20. A method to determine a target motor torque for a motor vehicle power steering mechanism, wherein the motor vehicle power steering mechanism has an electric motor for steering assist and/or steering, a steering controller configured to control the electric motor with a position control mode for autonomous driving and/or automatic steering and a torque control mode for manual steering, wherein the steering controller comprises a steering column reference controller, an arbitration unit, a column torque controller, and a steering algorithm, the method comprising:
calculating a first reference steering column torque for position control based on a reference position, a measured position, and states determined by the steering column reference controller;
calculating a second reference steering column torque for torque control based on the states determined by the steering algorithm;
weighting and adding of the first and second reference steering column torques by the arbitration unit;
sending the output of the arbitration unit to the column torque controller;
calculating, via the column torque controller, the target motor torque,
wherein the reference position and the measured position correspond to the reference and measured position of a rack and pinion steering gear, respectively,
wherein said weighting is based on one or more of the following parameters: a measured TSU torque, a vehicle speed, a measured position, and a speed of the rack and pinion steering gear,
wherein the weighting comprises:
when the measured TSU torque is below a predefined minimum value, said weighting of the output of the steering column reference controller is set to a high value; and
when the measured TSU torque is higher than a predefined maximum value, said weighting of the output of the steering torque algorithm is set to a high value.

* * * * *